United States Patent
Eldredge (10) Patent No.: US 6,753,988 B1
(45) Date of Patent: Jun. 22, 2004

(54) APPARATUS AND METHOD FOR COLOR DATA CONVERSION

(75) Inventor: James G. Eldredge, Meridian, ID (US)

(73) Assignee: Cypress Semiconductor Corp., San Jose, CA (US)

(*) Notice: Subject to any disclaimer, the term of this patent is extended or adjusted under 35 U.S.C. 154(b) by 125 days.

(21) Appl. No.: 10/112,383

(22) Filed: Mar. 29, 2002

(51) Int. Cl.[7] .................................................. H04N 1/46
(52) U.S. Cl. ....................... 358/535; 358/518; 358/523; 358/525
(58) Field of Search ................................ 358/518, 520, 358/522, 523, 530, 2.1, 11.9, 537, 535; 382/166, 167, 162; 345/419, 600, 601

(56) References Cited

U.S. PATENT DOCUMENTS

| | | | | |
|---|---|---|---|---|
| 3,938,102 A | | 2/1976 | Morrin et al. ............ 340/172.5 |
| 3,995,253 A | | 11/1976 | Morrin, II et al. ......... 340/146.3 |
| 4,837,722 A | | 6/1989 | Sara ........................... 364/723 |
| 5,666,437 A | | 9/1997 | Vondran, Jr. ................. 382/167 |
| 5,684,981 A | | 11/1997 | Jones ......................... 395/516 |
| 5,717,507 A | | 2/1998 | Vondran, Jr. ................. 358/525 |
| 5,748,176 A | * | 5/1998 | Gondek ....................... 345/131 |
| 5,764,795 A | * | 6/1998 | Takeo et al. ................. 382/167 |
| 6,415,065 B1 | * | 7/2002 | Miyake ....................... 382/300 |
| 2001/0033288 A1 | * | 10/2001 | Nabeshima .................. 345/601 |
| 2003/0117415 A1 | * | 6/2003 | Lebowsky ................... 345/597 |

FOREIGN PATENT DOCUMENTS

JP  06036047 A  *  2/1994  ........... G06F/15/72

* cited by examiner

Primary Examiner—Jerome Grant, II
(74) Attorney, Agent, or Firm—Marger Johnson & McCollom, PC (57) ABSTRACT

A color data converter includes a plurality of memories configured to store lattice points for a color space. The lattice points of the first axis are assigned to memories in a sequential manner. The lattice points along the other two axes are assigned to memories in an alternating manner.

19 Claims, 4 Drawing Sheets

APPARATUS AND METHOD FOR COLOR DATA CONVERSION

BACKGROUND

The present invention relates to color data conversion and more particularly to devices and methods for converting color data from a color space to a print space.

Certain image processing devices, such as printers, displays, image rendering systems and output files may use a different color space than other image processing devices such as a color driver for a computer system, camera, display or input graphics file. For example, a cyan, magenta, yellow and black (CMYK) color space is used for a color printer. However, a red, green and blue (RGB) color space may be used for certain graphics files. Accordingly, a color transformation is needed for converting the RGB color space into the CMYK color space.

One method of color transformation uses a look-up table to store a plurality of color values associated with the CMYK color space. A conversion between the RGB color space and the CMYK color space is performed by indexing the CMYK values in the look-up tables using addresses corresponding with RGB color values, one look-up table per output color.

A large amount of memory is required for the look-up table. For example, a 24-bit RGB color system may use 8 bits for red color values, 8 bits for green color values and 8 bits for blue color values. This 24-bit RGB color system can require a table size of 16 MegaBytes (MBs) or larger per output color.

To reduce memory requirements, some color transformation devices combine interpolation with the color mapping process. The hybrid transformation process first identifies a set of vertices that surround or neighbor an input color point in the color space. A value for the second color space is then derived by interpolating the identified vertices to the relative position of the input color point. However, this interpolation process is computationally intensive.

SUMMARY

A color data converter includes a plurality of memories configured to store lattice points for a color space. The lattice points of the first axis are assigned to memories in a sequential manner. The lattice points along the other two axes are assigned to memories in an alternating manner.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

The present disclosure may be best understood with reference to the accompanying drawings.

DETAILED DESCRIPTION

Figure 1:
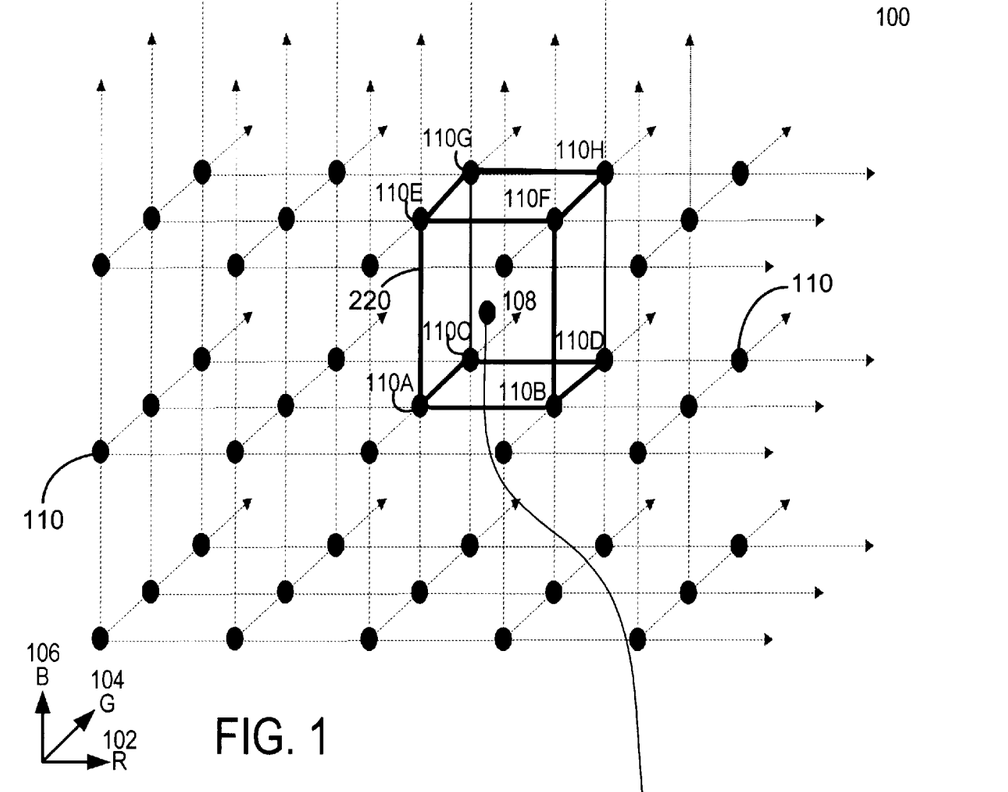
FIG. 1 shows the lattice points formed by samples of the output color at regular locations and illustrates the eight lattice points accessed for a given input value.
Figure 2:
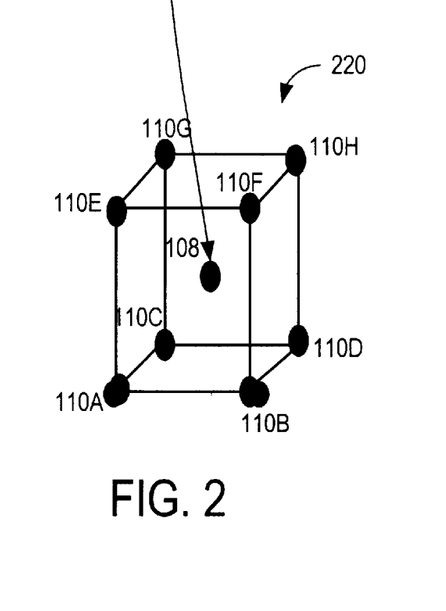
FIG. 2 shows lattice points for a unit cell neighboring an input color value.

FIGS. 1 and 2 show a three-dimensional color space 100. Various combinations of R, G and B components of the color space 100 are represented along separate x, y and z-axes 102, 104, 106, respectively. The color space 100 in one application is used for transforming an input RGB color value 108 into an output CYM color value.

The eight lattice points 110A–110H are identified for a unit cell 220 that contains the input RGB color value 108. The eight lattice points 110A–110H are interpolated to the input color value 108 to determine the output color values (C, M, Y or K).

As printing system performance requirements increase, it is desirable to implement this color space conversion in hardware, specifically on an application specific integrated circuit (ASIC). Because the cost of integrating memory on ASICs is relatively high, the method used for storing the sample lattice points needs to be efficient. In addition, because eight lattice point samples need to be accessed for every evaluation of the transfer function, the memory for certain applications should allow multiple lattice points to be accessed simultaneously.

In order to satisfy the performance requirements, multiple memory spaces may be used to access the eight lattice point samples 110A–110H. One way of assigning lattice points to multiple memory spaces is explained in FIG. 3.

Figures 3, 4:
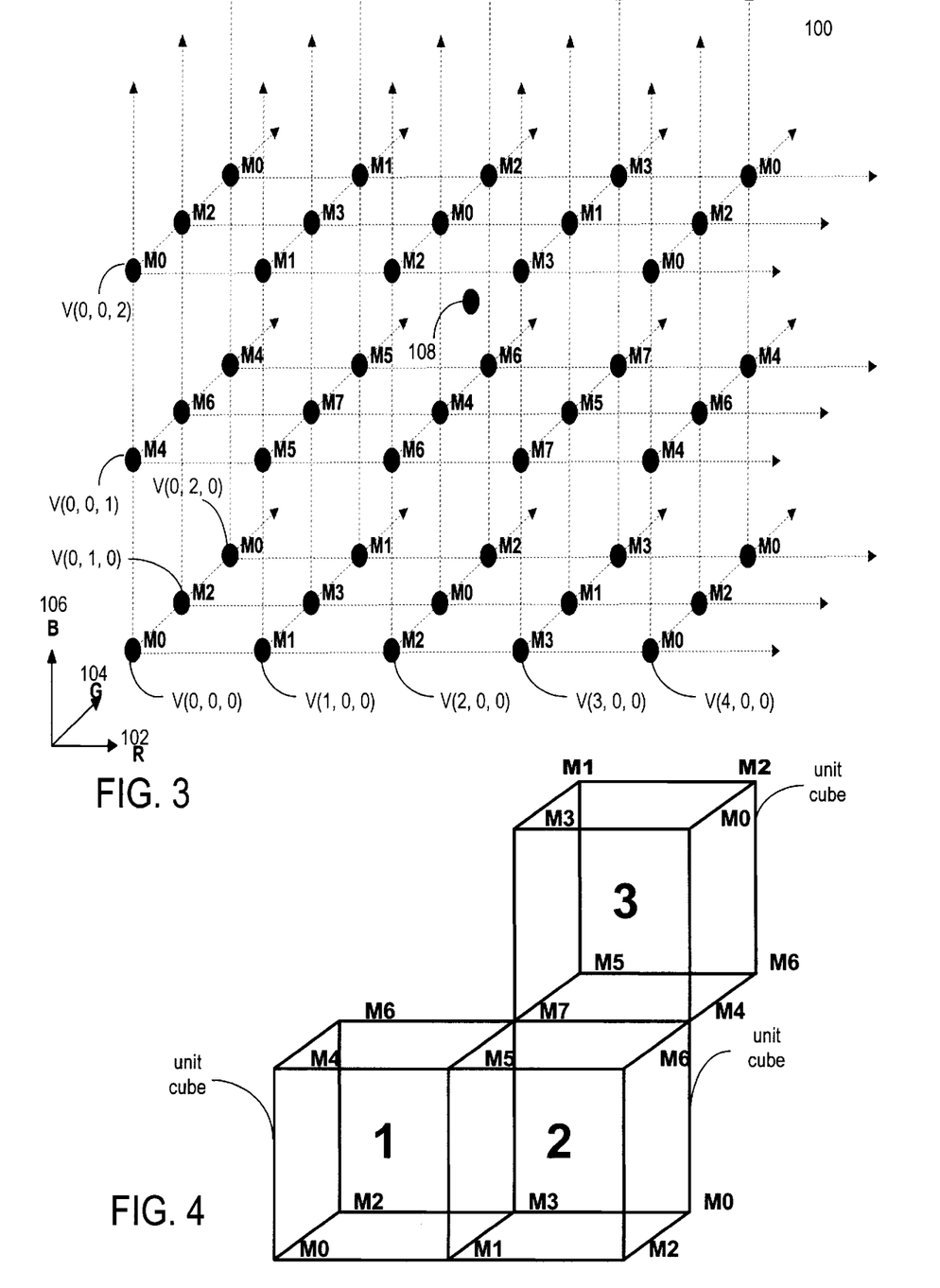
FIG. 3 shows one example of how memories are assigned to different lattice points in the color space.
FIG. 4 is an expanded view for a portion of the color space shown in FIG. 3.

Referring to FIG. 3, lattice points (samples) are indexed relative to the x, y, z axes 102, 104, 106 respectively. For example, the lattice point at the origin of color space 100 in FIG. 3 is referenced as V(0, 0, 0). The neighboring lattice point along the x-axis is referenced as V(1, 0, 0). The next remaining lattice points located sequentially along the x-axis are V(2, 0, 0), V(3, 0, 0) ... V(15, 0, 0). Similarly, along the y-axis the lattice points are referenced as V(0, 0, 0), V(0, 1, 0), V(0, 2, 0) ... V(0, 15, 0). Lattice points along the z-axis are referenced as V(0, 0, 0–15).

In the example shown in FIG. 3, four sequential lattice points V(0–3, 0, 0) along the x-axis are assigned to sequentially referenced memories M0, M1, M2 and M3, respectively. The assignment of lattice points sequentially in memories M0–M3 continues along the x-axis 102. For example, lattice points V(4–7, 0, 0) are assigned to memories M0–M3, respectively. Similarly, lattice points V(8–11, 0, 0) are assigned to memories M0–M3, respectively, and lattice points V(12–15, 0, 0) are assigned to memories M0–M3, respectively.

The lattice points V(0–15, 1, 0) extend along a next x-axis in a next vertical plane. These lattice points are assigned to memories M2, M3, M0, M1, respectively. Lattice points V(0–3, 1, 0) are assigned to memories M2, M3, M0, M1, respectively; lattice points V(4–7, 1, 0) are assigned to memories M2, M3, M0, M1 respectively; lattice points V(8–11, 1, 0) are assigned to memories M2, M3, M0, M1, respectively, and lattice points V(12–15, 1, 0) are assigned to memories M2, M3, M0, M1, respectively. The lattice points V(0–15, 2, 0) along the x-axis of a next vertical plane are assigned to memories in the sequence M0–M3 similar to the x-axis V(0–15, 0, 0).

The lattice points are also assigned sequentially to memories along the x-axis of a next upper horizontal plane. For example, lattice points V(0–3, 0, 1) are assigned to memories M4, M5, M6, M7, respectively. The remaining lattice points along this x-axis are assigned in similar sequential fashion to memories M4–M7, respectively.

Lattice points along the y and z axes of the color space 100 may be assigned to memories in a mirrored relationship about an intersecting axis. For example, lattice point V(0, 0, 1) may be assigned to memory M4. On opposite sides of the x-axis V(0, 0, 1) that passes through lattice point V(0, 0, 1), the lattice points V(0, 0, 0) and V(0, 0, 2) are each assigned to memory M0. Likewise, lattice points immediately above and below lattice point V(0, 0, 2) are both assigned to the same memory M4. A similar mirrored relationship may exit along the y-axis 104. For example, lattice point (0, 1, 0) may be assigned to memory M2. The lattice points V(0, 0, 0) and V(0, 2, 0) on opposite sides of V(0, 1, 0) are both assigned to memory M0.

This is only one example of how the lattice points are assigned to the memories M0–M7. It should be understood that other lattice point/memory assignment can also be used. For example, more or less than four sequential memories may be used to store sequential lattice points along one of the axes. Also any of these different memory assignments can be used with more than eight memories or less than eight memories.

Referring to FIG. 4, the lattice point samples are assigned to memories M0–M7 in a regular, periodic fashion that use the same lattice point for eight adjacent unit cubes. Memory M7 provides the far, upper right-hand lattice point for a unit cube 1, which is also the far, upper left-hand lattice point for a unit cube 2. Memory M7 also provides the front lower left-hand lattice point for a unit cube 3.

This means that address generation logic used for accessing the eight memories M0–M7 should generate the same address for the same lattice point contained within eight different unit cubes. The address generation logic used for accessing the eight memories must produce eight different addresses (one for each memory) for a given input value in order to access the eight lattice points constituting a unit cube. A reorganization is then needed after accessing memories M0–M7 since any of the eight memories M0–M7 could provide a given lattice point within the unit cube.

Figure 5:
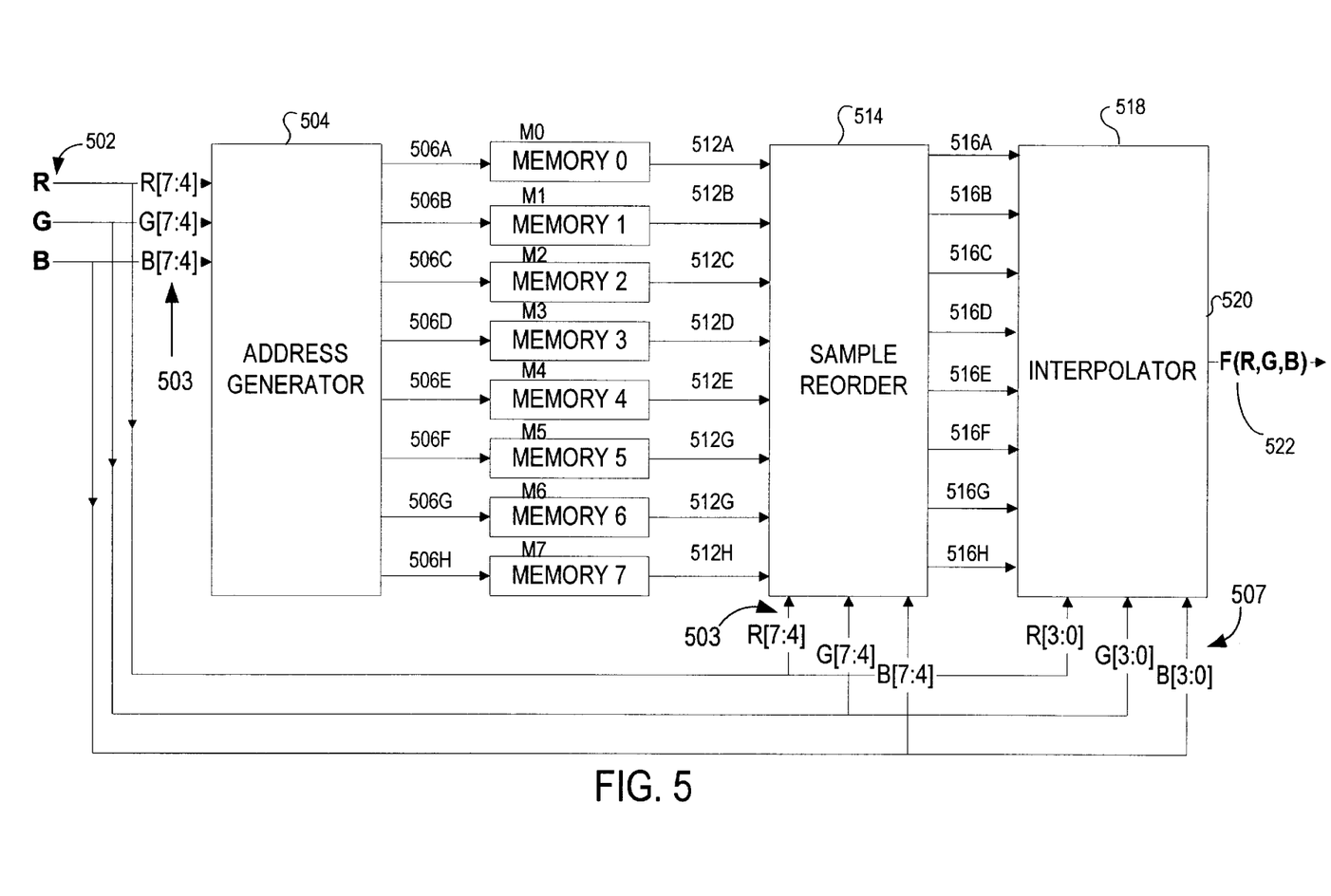
FIG. 5 is a block diagram of a color conversion circuit.

FIG. 5 shows a system for implementing the color transformation scheme described in FIGS. 1–4. A set of input RGB color values 502 arrives encoded as three 8-bit words. Red may be represented by 8 bit word R[7:0], green by G[7:0], and blue B[7:0]. Of course, the bit size for the RGB words can change for different applications. Also the size of the bit portions 503 and 507 described below can also vary depending on the application or the bit size of the RGB words. The RGB words 502 are divided into an upper 4-bit portion 503 and a lower 4-bit portion 507. This is convenient because in one example the color transfer function may be sampled at every sixteen units along the RGB axis. The upper 4-bits 503 of the RGB input data 502 identifies the unit cube 220 (FIG. 2) in which the input RGB data 108 lies. The lower 4-bits 507 identify where inside the unit cube 220 the input RGB color data 108 is located. Of course, the number of bits assigned to the high and low divisions can be different, four high and four low being the preferred embodiment.

An address generator 504 receives the upper 4-bits 503 of the RGB input color data 502 and generates eight separate addresses 506A–506E for memories M0–M7, respectively. The memories M0–M7 contain the lattice points for one of the color spaces shown in FIG. 1–4. It should be understood that the memories M0–M7 may comprise any type of memory such as, e.g., dynamic random access memory (DRAM), static random access memory (SRAM), random access memory (RAM), read only memory (ROM) or other volatile or non-volatile memory types.

The eight lattice points 110A–110H for the unit cube 220 surrounding the input color point 108 (FIG. 2) are output to a sample reorder circuit 514. As described in FIG. 4, the memories M0–M7 may contain a different lattice point for different unit cubes. The sample reorder circuit 514 uses the upper 4-bits 503 of the input RGB data 502 to reorder the eight lattice points in a known order. The interpolator 518 then uses the eight reordered lattice points 516A–516H to interpolate to the input color data point 108 identified by the lower 4-bits 507 of the input RGB data 502. The result of the interpolation is the output CYM color data.

Address Generation

The address generator 504 uses the upper four bits R[7:4], G[7:4] and B[7:4] of the input RGB data 502 to generate addresses 506A–506H. A set of x, y and z coordinate data may be related to the input RGB color data 502 through the following equations:

$$z = R[7:4] \qquad \text{Equation 2.1}$$

$$y = G[7:4] \qquad \text{Equation 2.2}$$

$$x = B[7:4] \qquad \text{Equation 2.3}$$

A variable m represents a particular one of the memories M0–M7. In this example, variable m represents one of the integer values 0, 1, 2, 3, 4, 5, 6, or 7. A mode value may be determined as follows.

$$\text{mode} = m - ((4z + 2y + x)\%8) \qquad \text{Equation 3.0}$$

The notation "%" represents a modulus (remainder) operation. For example, 11%8 is equal to 3 and 16%8 is equal to 0. Variables x, y, z may be redefined by new variables as follows:

$$z' = z + \text{mode}[2] \qquad \text{Equation 4.0}$$

$$y' = y + \text{mode}[1] \qquad \text{Equation 4.1}$$

$$x' = x + \text{mode}[0] \qquad \text{Equation 4.2}$$

Using variables x', y', z', the addresses 506A–506H are defined by equation 5.0 as follows:

$$A(m) = C0(z'/2) + C1(z'\%2) + C2(y'/4) + C3(y'\%4) + (z'[0]\ ?(y'\%4 > C4):(y'\%4 > C5)) + x'/8 \qquad \text{Equation 5.0}$$

The expression (z'[0]?(y'%4>C4):(y'%4>C5)) represents an if-then-else function as follows:

IF (z'[0]==1) THEN
   return (y'%4>C4)
ELSE
   return (y'%4>C5).

The expression "return (y'%4>C4)" generates a "1" value when y'%4 is greater than C4 and otherwise generates a "0" value. The expression "return (y'%4>C5)" generates a "1" value when y'%4 is greater than C5 and otherwise generates a "0" value.

For the address A(m) of equation 5.0, variables C0, C1, C2, C3, C4 and C5 have values for particular memories m as shown in table 1.0.

TABLE 1.0

| m | C0 | C1 | C2 | C3 | C4 | C5 |
|---|----|----|----|----|----|----|
| 0 | 77 | 39 | 9  | 2  | 2  | 2  |
| 1 | 68 | 34 | 8  | 2  | 3  | 3  |
| 2 | 76 | 38 | 9  | 2  | 3  | 1  |
| 3 | 68 | 34 | 8  | 2  | 3  | 3  |
| 4 | 77 | 38 | 9  | 2  | 0  | 2  |
| 5 | 68 | 34 | 8  | 2  | 3  | 3  |
| 6 | 76 | 38 | 9  | 2  | 1  | 3  |
| 7 | 68 | 34 | 8  | 2  | 3  | 3  |

Sample Reorder

As described above in FIG. 4, different memories may provide different lattice points for different unit cubes 220. For example, for one input RGB data point, memory 510A may contain a lattice point for a lower front left corner of the identified unit cube. For a different input RGB data point, memory 510A may contain a lattice point for an upper back left corner of the identified unit cube. Sample reorder circuit 514 recorders the lattice points output from memories M0–M7 in some common order. For example, sample recorder circuit 514 may reorder the lattice points so that output 516A outputs the lattice point for the front lower left corner for all unit cubes output from memories M0–M7.

The sample recorder circuit 514 arranges the lattice points 512A–512H output by the memories M0–M7 according to the upper bits R[7:4], G[7:4] and B[7:4] of the input RGB color data 502. The lattice points 512A–512H in one implementation are reordered to equations 6.0 and 7.0. Of course, other reordering schemes can also be used. The lattice points 516A–516H are referred to as V(n) in equation 6.0 and the memories M0–M7 are referred to as R as follows:

$$V(n)=R((n+o)\%8) \quad \text{Equation 6.0}$$

The term o is defined as follows:

$$o=((z[0]*2)+y[1:0])*2+x[2:0] \quad \text{Equation 7.0}$$

The x, y, z values are derived from equations 2.1–2.3 above. The term z[0] refers to the least significant bit of z, y[1:0] refers to the two least significant bits of y, and x[2:0] refers to the three least significant bits of x. For example, a value of 6 may be generated for variable o. The memory containing the third lattice point for the unit cube could be derived as follows:

$$V(3)=R(9\%8) \quad \text{Equation 7.1}$$

$$V(3)=R(1) \quad \text{Equation 7.2}$$

Accordingly, memory M1 outputs the third lattice point for the unit cube output from the memories M0–M7.

Interpolation

Interpolator 518 interpolates the reordered lattice points 516A–516H to an input RGB color point identified by the lower four RGB bits 507. One example, of an interpolation process that can be used by interpolator 518 is described below.

A cyan value C may be obtained using equation 8.0 below by dividing a difference between C values for the lattice points of the unit cube ($C_{1-C0}$) by the cubic region width. In the example shown in equation 8.0, the width of the unit cube is 16. Of course, the width value could be some other value. The result from the division is multiplied by a relative length established by the input color point 108 (FIG. 2) with respect to the surrounding lattice points 110A–110H (FIG. 2). The result from the multiplication is added to a base cyan value Co associated with the origin of the unit cube 220.

$$C_{out} = \left(\frac{y_{in} - y_0}{y_1 - y_0}\right) \times \left(\frac{C_1 - C_0}{16}\right) + C_0 \quad \text{Equation 8.0}$$

The magenta (M) and yellow (Y) output values are determined by the interpolator 518 in a similar fashion. For the interpolation shown in equation 8.0, the relative distance term $$\left(\frac{y_{in} - y_0}{y_1 - y_0}\right)$$

may be derived from the R(3:0), G(3:0) and B(3:0) color data.

Some or all of the different components of the color conversion circuit shown in FIG. 5 can be part of the same integrated circuit or separate integrated circuits. The address generator 504, sample reorder circuit 514 and interpolator 518 can be implemented in software or hardware. For example, these elements may be implemented in software using a programmable processor or may be implemented in hardware using different discrete logic devices. The memories M0–M7 may be separately addressable memory devices or may be different memory spaces in the same memory device.

Figure 6:
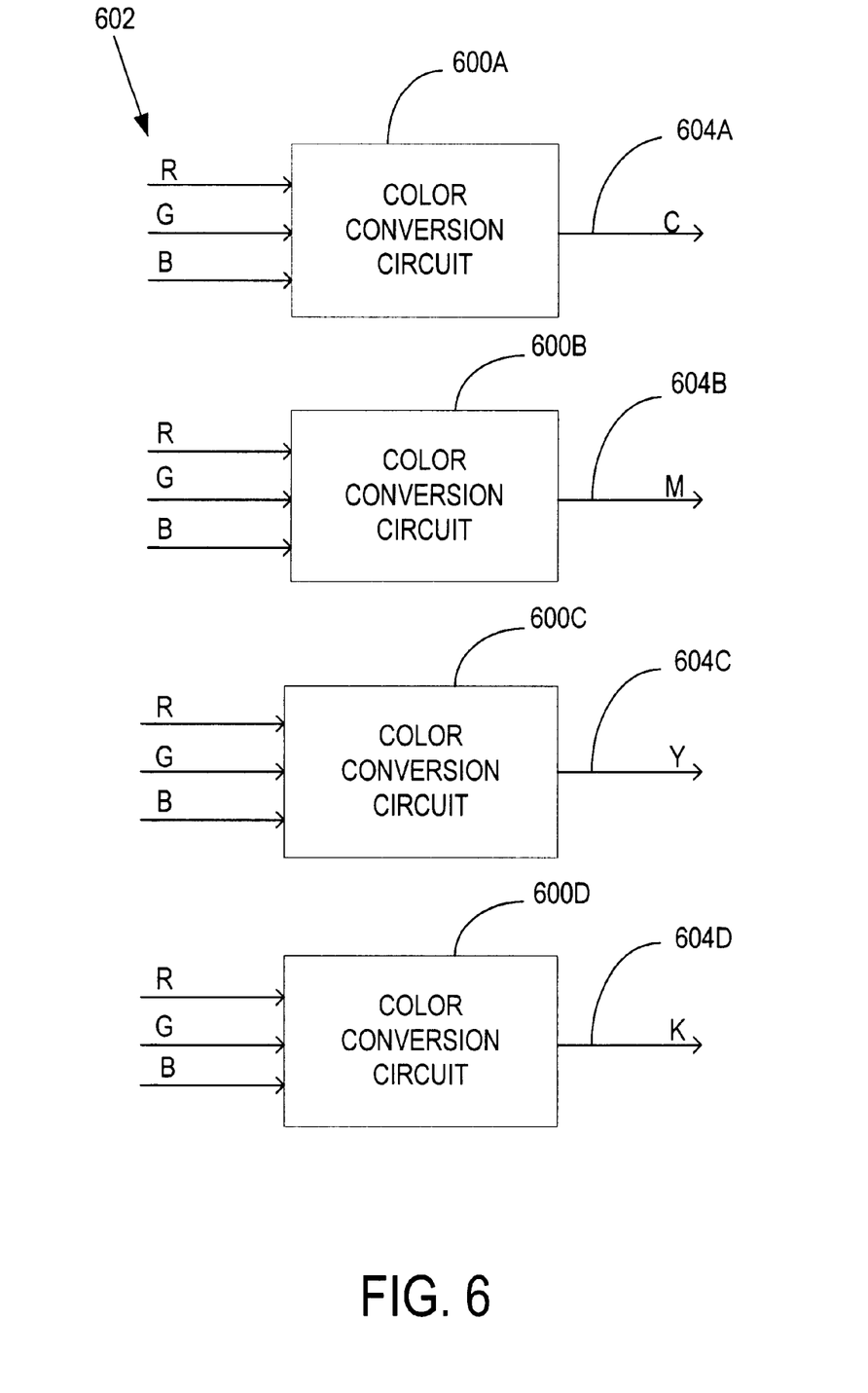
FIG. 6 shows how different conversion circuits can be used for outputting different output color values.

FIG. 6 shows separate color conversion circuits 600A–600D used for outputting different CYMK values. The same input RGB color data 602 is fed into the different color conversion circuits 600A–600D. Color conversion circuit 600A outputs cyan (C) color data 604A, circuit 600B outputs magenta (M) color data 604B, circuit 600C outputs yellow (Y) color data 604C, and circuit 600D outputs black (K) color data 604D.

Each color conversion circuit 600A–600D may contain circuitry similar to that shown in FIG. 5. However, the contents of the memories M0–M7 in the different color conversion circuits 600A–600D may differ according to the associated output color data 604A–604D, respectively.

In the present document, a single item may be labeled "first" or "second" or with another such identifier depending on its context or sub-context. This type of identifier may be provided for convenience and shall not necessarily imply that a "second" of something should necessitate a "first".

Additionally, readily-established circuits of the exemplary embodiments may be disclosed in simplified form (e.g., simplified blocks) in order to avoid obscuring an essence of the exemplary embodiments of the present invention. Likewise, to aid a clear and precise disclosure, description of their operations—such as timing considerations and the like—may similarly be simplified when persons of ordinary skill in the art can readily understand their operations by way of the drawings and present disclosure.

Embodiments of the present invention include devices and methods that may include provisions for conversion of color data. In examples, the color conversion may have been described with reference to color data of a first RGB color space and that of a second CMYK color space. It should be understood, however, that the scope of the present invention encompasses any color space that needs transformation into another color space.

Additionally, specific examples may have referenced a "print" color space. Although, a "print" color space represents a common output domain, alternative embodiments may establish output color data for domains and uses other than printing.

Specific exemplary embodiments disclosed may have been described with reference to color spaces of equal dimension. For example, exemplary embodiments may use R, G, B coordinate axes for a first color space and C, M, Y, K coordinate axes for a second color space. However, the dimensional order of the input and output color spaces do not have to be the same. For example, the second (print) color space may comprise four dimensions that include C, M, Y and black (K) coordinate axes.

It may be apparent to those skilled in this art that the disclosed embodiments are exemplary and that various changes and modifications may be made thereto as become apparent by the present disclosure. Accordingly, such changes and modifications are considered to fall within the scope of the appended claims.

What is claimed is:

1. A color data converter comprising:
   a plurality of memories configured to store lattice points for a color space;
   a sequential set of the memories storing at least three sequential lattice points along a first axis of the color space;
   a reorder circuit configured to identify what corners of a unit cube are associated with the lattice points output from the memories; and
   alternating lattice points along a second axis of the color space stored in a same one of the memories.

2. A converter according to claim 1 wherein the memories each contain one unique lattice point for different unit cubes in a print space.

3. A converter according to claim 1 including an address generator configured to generate addresses for each of the memories, the addresses each identifying one unique lattice point stored in one of the memories for a unit cube surrounding an input color point.

4. A converter according to claim 3 wherein the address generator generates addresses according to the following:

$$A(m)=C0(z'/2)+C1(z'\%2)+C2(y'/4)+C3(y'\%4)+(z'[0]\,?(y'\%4>C4):(y'\%4>C5))+x'/8$$

where A(m) is an address for one of the memories m; z'=z+mode [2]; y'=y+mode [1]; x'=x+mode [0]; z=R [7:4]; y=G[7:4]; x=B[7:4]; R(7:4), G(7:4) and B(7:4) are the upper 4 bits of R, G, B color values; mode= m−((4z+2y+x)%8); "%" represents a modulus (remainder) operation; the expression (z'[0]? (y'%4>C4):(y'%4>C5)) represents an if-then-else logical function where:
   IF (z'[0]==1) THEN
      return (y'%4>C4)
   ELSE
      return (y'%4>C5);
the expression "return (y'%4>C4)" generates a "1" value when y'%4 is greater than C4 and otherwise generates a "0" value, and the expression "return (y'%4>C5)" generates a "1" value when y'%4 is greater than C5 and otherwise generates a "0" value; and
variables C0, C1, C2, C3, C4 and C5 have values for the memories m as follows:

| m | C0 | C1 | C2 | C3 | C4 | C5 |
|---|----|----|----|----|----|----|
| 0 | 77 | 39 | 9  | 2  | 2  | 2  |
| 1 | 68 | 34 | 8  | 2  | 3  | 3  |
| 2 | 76 | 38 | 9  | 2  | 3  | 1  |
| 3 | 68 | 34 | 8  | 2  | 3  | 3  |
| 4 | 77 | 38 | 9  | 2  | 0  | 2  |
| 5 | 68 | 34 | 8  | 2  | 3  | 3  |

-continued

| m | C0 | C1 | C2 | C3 | C4 | C5 |
|---|----|----|----|----|----|----|
| 6 | 76 | 38 | 9  | 2  | 1  | 3  |
| 7 | 68 | 34 | 8  | 2  | 3  | 3. |

5. A converter according to claim 1 wherein the reorder circuit arranges the lattice points output by the memories in a same order relative to the unit cube.

6. A converter according to claim 1 wherein the reorder circuit identifies the corners of the unit cube according to the following:

$$V(n)=R((n+o)\%8),$$

where V(n) is a location for one of the corners n of the unit cube; R is one of the memories; o=((z[0]*2)+y[1:0])*2+x [2:0]; z[0] is a least significant bit of a red color value, y[1:0] are the two least significant bits of a green color value, and x[2:0] are the three least significant bits of a blue color value.

7. A converter according to claim 1 including an interpolator that interpolates lattice points for a unit cube according to an input color value.

8. A converter according to claim 1 wherein alternating lattice points along a third axis of the color space are stored in the same memories.

9. A method for transforming color data into a different color space, comprising:
   saving a group of at least three lattice points aligned sequentially along a first axis of the color space in different memories;
   saving alternating lattice points along a second axis in a same memory;
   reordering lattice points stored in the different memories to identify what corners of a unit cube are associated with the lattice points.

10. A method according to claim 9 including saving alternating lattice points along a third axis of a color space in a same memory.

11. A method according to claim 9 including saving groups of lattice points aligned sequentially along the first axis in different horizontal planes of the color space in different sequential memories.

12. A method according to claim 9 including saving each of four lattice points located sequentially along the first axis in four sequentially ordered memories and saving a next four sequential lattice points extending along the first axis in the same sequential order with the same four sequentially ordered memories.

13. A method according to claim 9 including generating addresses for multiple memories causing each one of the addressed memories to output a unique lattice point of the multiple lattice points surrounding an input color point.

14. A method according to claim 13 including storing only one unique lattice point in each one of the multiple memories for each unit cube in the color space.

15. A method according to claim 13 including arranging the lattice points output by the multiple memories in a same relative order for different input color points.

16. A method according to claim 15 including interpolating the arranged lattice points according to least significant bits associated with the input color points.

17. A system for color conversion, comprising:
   an address generator configured to generate memory addresses accessing multiple sequential memory spaces storing at least three sequential vertices along a first axis of a color space and generate memory addresses accessing at least one memory space storing vertices along a second axis of the color space in mirrored relationship about an intersecting axis; and a reorder circuit configured to identify what corners of a unit cube are associated with the lattice points output from the memories.

18. A system according to claim 17 including separate memory spaces each storing unique vertices for each unit cube in the color space.

19. A system according to claim 17 including at least two separately addressable memories configured to store sequential vertices along a first axis of the color space and at least one separately addressable memory configured to store alternating vertices along a second axis of the color space.

\* \* \* \* \*

UNITED STATES PATENT AND TRADEMARK OFFICE
CERTIFICATE OF CORRECTION

PATENT NO. : 6,753,988 B1
DATED : June 22, 2004
INVENTOR(S) : Eldredge

It is certified that error appears in the above-identified patent and that said Letters Patent is hereby corrected as shown below:

Column 3,
Line 8, "x-axis V(0,0,1) that" should read -- x-axis V(0-15,0,1) that --.

Column 5,
Line 27, "sample recorder circuit" should read -- sample reorder circuit --.
Line 31, "reordered to equations" should read -- reordered according to equations --.
Line 63, "cube ($C_{1-C0}$) by" should read -- cube ($C_1-C_0$) by --.

Column 6,
Line 3, "value Co associated" should read -- value $C_0$ associated --.

Column 8,
Line 17, "is a location" should read -- is a lattice point location --.

Signed and Sealed this

Fifteenth Day of March, 2005

JON W. DUDAS
*Director of the United States Patent and Trademark Office*